(12) United States Patent
Balcombe

(10) Patent No.: US 12,528,428 B2
(45) Date of Patent: Jan. 20, 2026

(54) AUTONOMOUS DRIVING SYSTEM FOR A RACING CAR OR OTHER VEHICLE

(71) Applicant: ADA Innovation Lab Limited, Kent (GB)

(72) Inventor: Bryn Balcombe, Kent (GB)

(73) Assignee: ADA INNOVATION LAB LIMITED, Kent (GB)

( * ) Notice: Subject to any disclaimer, the term of this patent is extended or adjusted under 35 U.S.C. 154(b) by 866 days.

(21) Appl. No.: 17/293,601

(22) PCT Filed: Nov. 13, 2019

(86) PCT No.: PCT/GB2019/053214
§ 371 (c)(1),
(2) Date: May 13, 2021

(87) PCT Pub. No.: WO2020/099866
PCT Pub. Date: May 22, 2020

(65) Prior Publication Data
US 2022/0024395 A1      Jan. 27, 2022

(30) Foreign Application Priority Data

Nov. 13, 2018 (GB) ..................................... 1818492
Dec. 10, 2018 (GB) ..................................... 1820093
(Continued)

(51) Int. Cl.
*B60R 16/023* (2006.01)
*A63K 3/00* (2006.01)
(Continued)

(52) U.S. Cl.
CPC ............ *B60R 16/0231* (2013.01); *A63K 3/00* (2013.01); *B60K 20/02* (2013.01); *B60K 23/02* (2013.01);
(Continued)

(58) Field of Classification Search
CPC .. A63K 3/00; B60R 16/0231; B60R 16/0239; B60K 1/00–2704/04; B60S 1/56;
(Continued)

(56) References Cited

U.S. PATENT DOCUMENTS 9,802,638 B1 * 10/2017 Stoffel .................... G05G 1/36
10,023,124 B2 * 7/2018 Schmidt ................... B60R 5/02
(Continued)

FOREIGN PATENT DOCUMENTS

WO    WO-2017089316 A1 *  6/2017 ............. B60R 21/00
WO    WO-2018215707 A1 * 11/2018 ........... B60R 21/015
WO    WO-2019147235 A1 *  8/2019 ......... G01C 21/3841

OTHER PUBLICATIONS

Design of an Autonomous Racecar: Perception, State Estimation and System Integration ("Valls") Publication May 21, 2018 (Year: 2018).*

(Continued)

*Primary Examiner* — Mohamed Abdo Algehaim
(74) *Attorney, Agent, or Firm* — Saul Ewing LLP

(57) ABSTRACT

An autonomous driving system for a vehicle (e.g. a racing car) is installed in the space normally allocated to a human driver and is attached to the pre-existing anchor points used for structures that are no longer needed once a human is no longer required, such as the crash protection anchor points. The autonomous driving system enables AI and robotics technology to be seamlessly integrated into existing high-performance race car designs without requiring significant design modifications to the vehicle. This invention enables a new era of motorsport, where for example human drivers in a Formula One car can compete against the same car controlled by an autonomous driving system, because the design integrity of all cars remain identical.

61 Claims, 12 Drawing Sheets

(30) Foreign Application Priority Data

Mar. 8, 2019 (GB) ..................................... 1903153
Oct. 7, 2019 (GB) ..................................... 1914470

(51) Int. Cl.

| | |
|---|---|
| B60K 20/02 | (2006.01) |
| B60K 23/02 | (2006.01) |
| B60K 26/02 | (2006.01) |
| B60S 1/02 | (2006.01) |
| B60S 1/56 | (2006.01) |
| B60T 7/02 | (2006.01) |
| B60T 7/12 | (2006.01) |
| B62D 1/04 | (2006.01) |
| G05D 1/00 | (2024.01) |
| H04W 84/18 | (2009.01) |

(52) U.S. Cl.

CPC .......... B60K 26/02 (2013.01); B60R 16/0239 (2013.01); B60S 1/56 (2013.01); B60T 7/02 (2013.01); B60T 7/12 (2013.01); B62D 1/04 (2013.01); G05D 1/0212 (2013.01); *B60S 1/023* (2013.01); *H04W 84/18* (2013.01)

(58) Field of Classification Search

CPC ... B60S 1/023; B60T 7/02; B60T 7/12; B62D 1/04; B62D 15/025; B62D 1/00; B60W 2300/28; B60W 30/00; G05D 1/0212; G05D 2201/0213; G05D 1/021; H04W 84/18; B60J 1/00–11/10

USPC .............................................................. 701/2

See application file for complete search history.

(56) References Cited

U.S. PATENT DOCUMENTS

| | | | | |
|---|---|---|---|---|
| 10,890,921 | B2 * | 1/2021 | Gillett .................. | B62D 57/028 |
| 11,104,294 | B1 * | 8/2021 | Skaloud ................ | B62D 24/04 |
| 11,787,250 | B1 * | 10/2023 | Zecos ..................... | B60N 2/24 |
| | | | | 180/89.1 |
| 2011/0079166 | A1 * | 4/2011 | Popa-Simil ............ | B61C 17/06 |
| | | | | 180/2.2 |
| 2013/0333342 | A1 * | 12/2013 | Keski-Luopa ......... | A01D 43/14 |
| | | | | 56/10.2 A |
| 2016/0009320 | A1 * | 1/2016 | Ahn ........................ | B60J 7/143 |
| | | | | 280/639 |
| 2016/0335892 | A1 * | 11/2016 | Okada ..................... | G08G 1/164 |
| 2018/0134222 | A1 | 5/2018 | Schmidt et al. | |
| 2018/0208210 | A1 * | 7/2018 | Chapman ............... | B60K 35/10 |
| 2018/0239352 | A1 * | 8/2018 | Wang ................ | B60W 60/0051 |
| 2018/0255705 | A1 * | 9/2018 | Keski-Luopa ......... | A01D 69/06 |
| 2019/0031003 | A1 * | 1/2019 | Bennett .................... | B60J 7/104 |
| 2019/0211919 | A1 * | 7/2019 | Nishimura .............. | F16H 59/66 |
| 2019/0217812 | A1 * | 7/2019 | Boese ................... | B60N 2/4221 |
| 2019/0369641 | A1 * | 12/2019 | Gillett ................... | B62D 57/028 |
| 2020/0338464 | A1 * | 10/2020 | Pipitone ................ | G05D 1/0246 |
| 2021/0192975 | A1 * | 6/2021 | Spence .................. | B60K 35/28 |
| 2021/0221434 | A1 * | 7/2021 | Liu ................... | B60W 60/0015 |
| 2022/0009492 | A1 * | 1/2022 | Adwan ............... | B60W 40/105 |
| 2022/0050454 | A1 * | 2/2022 | Lacaze ................. | G05D 1/0212 |
| 2022/0227280 | A1 * | 7/2022 | Thieberger ............ | B60R 11/04 |

OTHER PUBLICATIONS

Autonomous Driving System Design for Formula Student Driverless Racecar ("Tian") Publication Jun. 26, 2018 (Year: 2018).*
A Race Simulation for Strategy Decisions in Circuit Motorsports ("Heilmeir") Publication Date Nov. 4, 2018 (Year: 2018).*
A Planning and Control System for Self-Driving Racing Vehicles ("Caporale") Publication Date Sep. 10, 2018 (Year: 2018).*
Broggi, Alberto, et al., "Extensive Tests of Autonomous Driving Technologies", IEEE Transactions on Intelligent Transportation Systems, IEEE, vol. 14, No. 3, pp. 1403-1415 (Sep. 1, 2013) XP011525557.
Wei, Junqing, et al., "Towards a viable autonomous driving research platform", 2013 IEEE Intelligent Vehicles Symposium (IV), IEEE, pp. 763-770 (Jun. 23, 2013) XP032502021.
International Search Report, dated Jun. 26, 2020, issued in International Application No. PCT/GB2019/053214.

* cited by examiner

H·E·R·O
HUMAN EMULATING ROBOT OPERATOR

AUTONOMOUS DRIVING SYSTEM FOR A RACING CAR OR OTHER VEHICLE

CROSS REFERENCE TO RELATED APPLICATIONS

This application claims the priority of PCT/GB2019/053214, filed on Nov. 13, 2019, which claims priority to GB Application No. GB 1818492.9, filed on Nov. 13, 2018; GB Application No. GB 1820093.1, filed on Dec. 10, 2018; GB Application No. GB 1903153.3, filed on Mar. 8, 2019; and GB Application No. GB 1914470.8, filed on Oct. 7, 2019, the entire contents of each of which being fully incorporated herein by reference.

BACKGROUND OF THE INVENTION

1. Field of the Invention

This invention relates to an autonomous driving system for a racing car or other vehicle.

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

2. Description of the Prior Art

Artificial Intelligence (AI) and robotics innovations will define the next era of mobility. Motorsport has played an important role in the development of cutting edge technologies that transfer to road vehicles.

These high performance racing car series have in the past been an important development and testing environment for technologies that have passed into mainstream motor car design. For example, seat belt mounting points were made mandatory on F1 in 1967, but no country mandated seat belts for ordinary road going cars until 1970. There is a risk that these race series will not play a significant role in developing autonomous driving innovations, including safety enhancing innovations.

Many AI and robotics technologies are banned in traditional motorsport events if it means the human is not driving the car alone and unaided according to Sporting Regulations. The Technical Regulations are also not written to support the inclusion of these innovative technologies with the design of high-performance race cars such as a FIA Formula 1 (or a Formula E, F2, F3, F4 or IndyCar).

Significant design changes would be required to incorporate sensors (Radar, LIDAR, Cameras etc) into the bodywork, chassis and electronics architectures into these high-performance race cars. Bodywork changes required to incorporate sensors would significantly affect the race car aerodynamic performance. The size, weight and power consumption of the sensors and associated AI computers would also significantly affect the baseline race car performance. Even if the regulations allowed these systems, the negatives outweigh the advantages these systems would offer to drivers.

For motorsport to stay relevant to cutting edge AI and robotics mobility technologies, there needs to be a change. However, this is in practice impossible to achieve, since these sorts of very high performance race cars are not designed to be modified in these ways, and the pressure on the car constructors to focus exclusively on their human-based race series precludes them having a parallel track of developing the same car with autonomous driving capabilities.

This invention addresses that problem. It ensures that AI and robotics technology can be seamlessly integrated into existing high-performance race cars and other vehicles.

SUMMARY OF THE INVENTION

The invention is an autonomous driving system configured (a) to be installed in a vehicle originally configured or designed to be human-driven and (b) to replace one or more components that would otherwise be present in the original vehicle, and (c) to occupy at least some of the space that would otherwise be occupied by a human, such as a driver or pilot, and (d) to provide autonomous driving capabilities to that vehicle, the autonomous driving system including one or more sensors and compute resources, operating to provide an autonomous or remote driving system.

The autonomous driving system for a vehicle (e.g. a racing car) may therefore be installed in the space normally allocated to a human driver and may be attached to the pre-existing anchor points used for structures that are no longer needed once a human is no longer required, such as the crash protection anchor points. The autonomous driving system enables AI and robotics technology to be seamlessly integrated into existing high-performance race car designs without requiring significant design modifications to the vehicle.

One implementation is called the HERO ("Human Emulating Robot Operator") autonomous driving system; this system removes the human driver from the cockpit and uses the occupant space to install a self-contained autonomous driving system. Once installed, the HERO autonomous driving system is able to be used for fully autonomous driving. The autonomous driving system also enables remote driving capabilities (such as teleoperation).

This invention enables a new era of motorsport, where for example human drivers in a Formula One car can compete against the same car controlled by an autonomous driving system, because the safety design integrity of cars remains identical.

The HERO autonomous driving system enables AI and robotics technology to be seamlessly integrated into existing high-performance race car designs without requiring significant design modifications to the vehicle. HERO is designed specifically for installation in the occupant space normally allocated to a human driver or other occupant—for example, within a single seater racing car or other vehicle.

We can think of HERO as applying to a car or vehicle in which a cockpit, or parts of that cockpit, are replaced with the autonomous driving system; the items or structures replaced are typically no longer required once a human driver is no longer needed to drive the vehicle. For example, the HALO driver crash protection system can be the part of the cockpit that is replaced. HALO, in relation to a race car, is a driver crash protection system used in series like F1 and F2, which consists of a curved bar placed to above, side and in-front of the driver to protect the head form large object impact. The system attaches to three anchor points in the vehicle frame: one to each side and slightly behind the driver's head and a single mounting directly in the front of the driver on the centre line of the vehicle. The component is typically made of titanium or steel. Since the HALO crash protection system is no longer needed in a human-free vehicle, the HERO autonomous driving system can attach to these pre-existing HALO anchor points and occupy much of the region in the carbon fibre monocoque chassis or tub that would otherwise be occupied by the human driver. A different crash protection system, the AeroScreen, is used in IndyCar racing cars; the autonomous driving system can then use the pre-existing anchor points that would otherwise be used for the AeroScreen.

The HERO autonomous driving system, once installed, enables fully autonomous driving (where onboard software executes the driving task) or remote driving/teleoperation (where a human or software remotely executes the driving task).

With this overall system, car designers and manufacturers can continue to innovate and evolve their designs without concerning themselves about the requirements for autonomous driving systems. And organisations that are developing autonomous driving capabilities (e.g. AV companies, manufacturer research groups, mobility providers, universities, AI-based companies) can access a high performance racing car for their software, sensors, compute engines, without the need to develop that racing car. The HERO autonomous driving system can be applied to other modes of transport, including; airplane (such as Red Bull Air Race World Championship), powerboats (such as UIM F1H2O World Championship), Le Mans Prototype sportscars and go-karts.

In each case, the basic HERO principle is the same: a region or volume of the vehicle that is usually occupied by a driver or other occupant is instead occupied by an autonomous driving or piloting system replaces components or systems that are no longer needed once the vehicle has no human driver; for example, the autonomous driving system can be physically anchored to the frame of the vehicle using pre-existing anchor points for structures that are no longer needed for a human-driver free vehicle; the HERO autonomous driving system is specifically configured so that it can be retro-fitted to an existing vehicle and enables that existing vehicle to be re-purposed for autonomous or remote operation, without the time and complexity of redesigning that vehicle to include the various complex components (multiple sensors, data buses, power source, power feeds, computers) required for an autonomous driving or piloting system.

Whilst we have described the advantages of this approach when retro-fitting an autonomous driving system to a vehicle originally configured or designed to be human-driven, we can also apply this approach to fitting an autonomous driving system to a vehicle that is co-designed for both human and autonomous operation. For example, in a single seat racing car, the entire front monocoque or tub could be designed with one version for a human driver (with conventional features, such as anchors for seats, seatbelts, dashboard, rear facing mirrors etc.) and another version for a robot or autonomous driving system; the vehicle components that are external to the monocoque (e.g. bodywork, engine, suspension etc.) attach to both versions in the same manner, and the chassis performance of the monocoque that incorporates the autonomous driving system can be identical to the chassis performance of the human-driven variant, so there is substantial re-use of vehicle engineering across both human driven and autonomous variants. Complex and costly carbon fibre and Kevlar engineering of the monocoque, designed to protect the human driver in the event of a crash, can be substantially simplified in the case of the monocoque that incorporates the autonomous driving system. We can generalise as follows:

An autonomous driving system configured (a) to be installed in a vehicle configured or designed to be human-driven and (b) to replace one or more components that would otherwise be present in the original vehicle, and (c) to occupy at least some of the space that would otherwise be occupied by a human, such as a driver or pilot, and (d) to provide autonomous driving capabilities to that vehicle, the autonomous driving system including one or more sensors and compute resources, operating to provide an autonomous or remote driving system.

Ten other aspects (A-J below) include:

A. A vehicle racing system including one or more human-driven vehicles of a specific type and one or more vehicles of the same type and that are equipped with an autonomous driving system, in which each autonomous driving system is (a) installed in an original vehicle of that specific type and (b) replaces one or more pre-existing components that would otherwise be present in the original vehicle, and (c) occupies at least some the space that would otherwise be occupied by a human, such as a driver or pilot, and (d) configured to provide autonomous driving capabilities to that vehicle, the autonomous driving system including one or more sensors and compute resources, operating to provide an autonomous or remote driving system.

B. A vehicle racing system including (a) one or more human-driven vehicles of a specific type; (b) one or more vehicles of the same type and that are equipped with an autonomous driving system as defined above; (c) one or more human-driven vehicles of an alternative type; and (d) one or more vehicles of the same alternative type and that are equipped with an autonomous driving system as defined above.

C. A digital game or virtual world system programmed with a digital twin or replica vehicle of a real-world vehicle in which the twin or replica vehicle is (a) equipped with a virtual autonomous driving system that operates within a virtual world generated by the game or virtual world system and (b) connected, in real-time, to the equivalent physical vehicle in the real-world, and in which the game replicates the location, and/or status and/or movement of the real-world vehicle in their digital twin or replica vehicle in the virtual world.

D. A digital game or virtual world system programmed with a digital twin or replica vehicle of a real-world vehicle in which the twin or replica vehicle is connected, in real-time, to the equivalent physical vehicle in the real-world, the physical vehicle including an autonomous driving system as defined above, and in which the game replicates the location, and/or status and/or movement of the real-world vehicle in the digital twin or replica vehicle in the virtual world.

E. A digital game or virtual world system programmed with a digital twin or replica vehicle of a real-world vehicle in which the twin or replica vehicle is (a) equipped with an autonomous driving system that exists within a virtual world generated by the game or virtual world system and (b) communicates its location, and/or status and/or movement to vehicles and/or human-drivers and/or autonomous driving systems that each exist in the real-world.

F. A method of testing and developing autonomous driving systems, comprising the step of using the autonomous driving system is as defined above, as part of a technology testing and development program.

G. A method of testing and development autonomous driving systems using the autonomous driving system is as defined above, combining Model in loop (MIL), Software in loop (SIL), Processor in loop (PIL), Hardware in loop (HIL) Driver in the loop (HIL), physical and virtual testing scenarios.

H. A vehicle designed using the results of the testing and developing method defined above.

I. A vehicle including an autonomous driving system is as defined above.

J. A method of operating a vehicle, comprising the step of operating the vehicle defined above.

DETAILED DESCRIPTION

The invention is implemented in the HERO autonomous driving system; this system is configured (a) to be installed in a vehicle originally configured or designed to be human-driven and (b) to replace one or more components that would otherwise be present in the original vehicle, and (c) to occupy at least some of the space that would otherwise be occupied by a human, such as a driver or pilot, and (d) to provide autonomous driving capabilities to that vehicle, the autonomous driving system including one or more sensors and compute resources, operating to provide an autonomous or remote driving system.

We will organise our description of the HERO autonomous driving system into the following sections:

A: Physical mounting
B: Sensors
C: Communications and data transfer
D: Mechanical engineering
E: Software
F: Physical form
G: Spectator experience
H: Internal Zone organisation
I: Virtual Worlds
A: Physical Mounting The HERO autonomous driving system uses pre-existing anchor or fixing points in the vehicle for one or more of the components that are replaced by the autonomous driving system, or no longer needed once there is an autonomous driving system.

The components that may be replaced can be any one or more of the following: driver crash protection system, windshield, seat, seatbelts, steering wheel, or any other suitable component (where the term 'component' includes any sort of device, fitting or other kind of structure). Pre-existing anchor points in the vehicle are used by the autonomous driving system to avoid the need to re-engineer the vehicle; these anchor points can include any one or more of the following: one or more seat anchor points; one or more seatbelt anchor points; one or more headrest anchor points; one or more windshield anchor points; one or more Aero-Screen anchor points; one or more deformable crash protection system anchor points.

Figure 1:
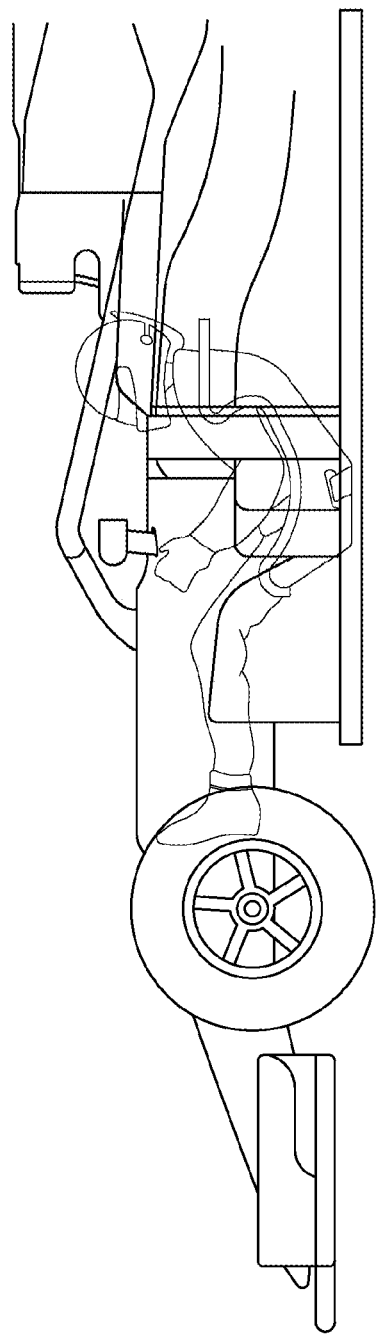
FIG. 1 is a schematic cut-away of a generic single seat race car using the conventional HALO driver protection system, showing also the human driver.
Figure 2:
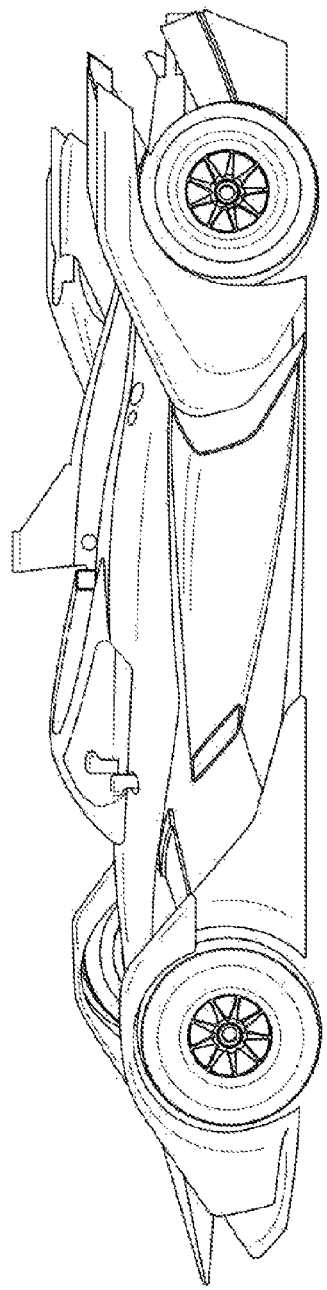
FIG. 2 is a greyscale render of a Formula E Gen 2 single seat race car (without the driver).

In the HERO autonomous driving system implementation, the pre-existing anchor points include one or more HALO deformable crash protection system anchor points. FIG. 1 shows the HALO crash protection system 1 fitted to a generic single seater race car. HALO includes a Y shaped bar that anchors at a single anchor point in the vehicle in front of the driver and a vehicle anchor point behind each of the driver's shoulders. FIG. 2 is a render of a typical Formula E Gen 2 race car fitted with the HALO crash protection system 1. Making this original Formula E car autonomous would, conventionally, require substantial re-engineering of the entire vehicle body—for example fitting cameras and other sensors in the nose cone and other parts of the vehicle body, which would require extensive aerodynamic testing and optimisation and body work integrity testing and strengthening, and then laying data and power cables through the vehicle to the computers and power sources, with added weight and constructional complexity; working out where to position those computers and power sources and how to cool them, and compensating for any impact on integrity or weight distribution; working out how to minimally impact the highly complex carbon-fibre monocoque or tub that would normally protect the driver and is an integral part of the structure of the vehicle.

But with the HERO autonomous driving system, those problems are substantially reduced, since it is a fully self-contained autonomous driving system, including all required sensors, compute resources, power and data cabling, communications sub-systems, and cooling sub-systems, and it is anchored to pre-existing anchor points in the vehicle, such as the pre-existing HALO anchor points and the secondary roll structure in front of the driver cockpit. It enables companies or organisation that are specialists in AI and autonomous driving software to focus on what they do best—namely AI and autonomous driving systems—without having to concern themselves about how to integrate their systems into a complex, highly engineered vehicle; and for the engineers to focus on what they do best—vehicle engineering—without having to concern themselves about how to design, develop and integrate complex AI and autonomous driving systems.

The HERO autonomous driving system, when organised as a single unit, is designed to be flexible or articulated or expandable or collapsible to facilitate installation or removal from the vehicle. It may be expandable so that contact with surfaces of the cockpit and occupant space is sufficient for secure installation within the vehicle. i.e. removing or reducing the need to use pre-existing mechanical anchor points.

Figure 3:
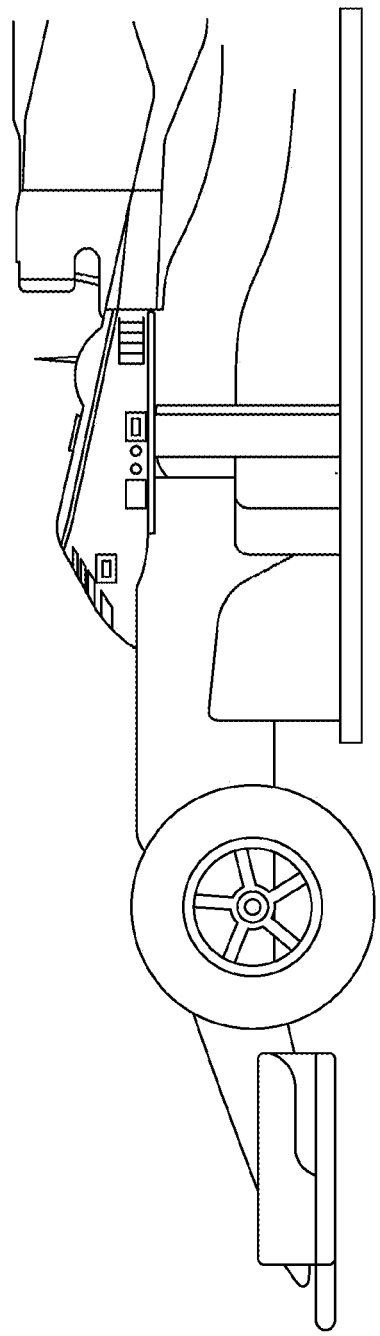
FIG. 3 is a schematic of a generic single seat race car using the HERO autonomous driving system, replacing the HALO driver system and the region other occupied by the human driver.
Figure 4:
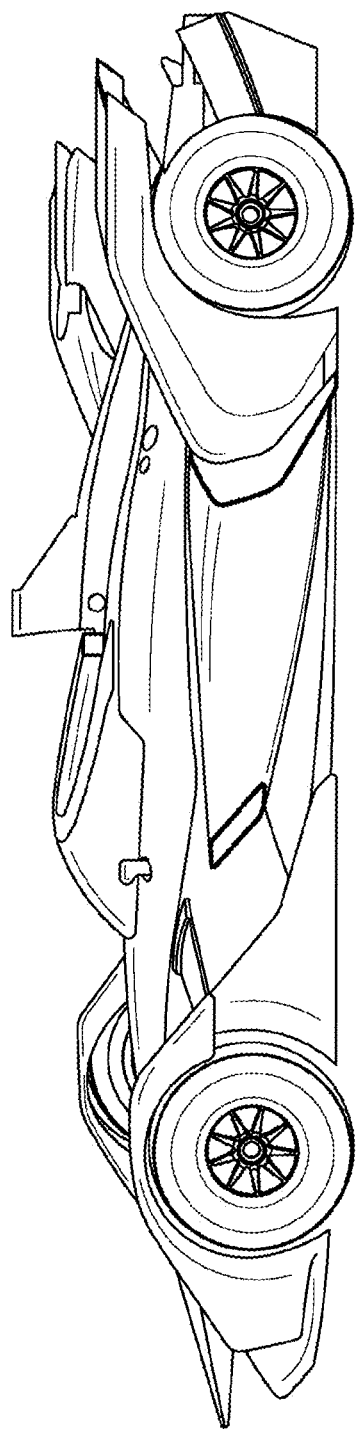
FIG. 4 is a greyscale render of a Formula E Gen 2 single seat race car, implementing the HERO autonomous driving system.

FIG. 3 shows the exposed canopy section 30 of the HERO autonomous driving system; this section includes various cameras and sensors. The rest of the HERO autonomous driving system is fitted within the pre-existing carbon fibre monocoque or tub and is not visible. The canopy 30 is secured to the vehicle using the pre-existing HALO anchor points. The canopy includes various sensors and cameras, as will de described later. FIG. 4 is a render showing the entire Formula E vehicle, now made autonomous through the inclusion of the HERO autonomous driving system.

B: Sensors

The HERO autonomous driving system may include substantially all sensors needed to enable autonomous performance. HERO may include one or more of the following sensors: radar, LIDAR, cameras, machine vision cameras, IR cameras, hyper-spectral cameras, event based cameras that trigger at the pixel level when light levels on a pixel alter, Global Navigation Satellite System GNSS; inertial measurement systems; vibration and acoustic sensors, aerodynamic sensors, Ultrawide Band Positioning System, air pressure sensors, magnetometers, temperature sensors, rain sensors, lap count sensors, RFID sensors, ground penetrating radar. Forward, sideways and rearward facing sensors may be included to provide 360 degree environment information. Vertically orientated sensors may be included to capture physical objects in the environment and also the light field above the vehicle. As new sensors and communications systems are developed or test or repairs needed, then it may be possible to simply remove the HERO autonomous driving system, or the sensor canopy, without further affecting the rest of the vehicle; this makes the test, repair, replacement or enhancement of those sensors and communications systems far easier. New homologation rules or standards may regularly emerge and apply to these sensors and communications systems and other aspects of autonomous vehicles, and the ability to rapidly respond to new homologation rules or standards, without affecting the base vehicle, is very valuable.

The HERO autonomous driving system parts or subsystems may be configured to replace or supplement camera/camera housing locations that are mandated for that car, such as the following camera/camera housing locations: the wing mirrors, the sides of the nose, the sides of engine cover and the top of the roll hoop/airbox.

Supplementary computers, processors or computational resources may be allocated to the processing of sensor data for the purposes of media and entertainment content production. Data from sensors and equipment may be recorded using storage devices onboard the vehicle. The HERO autonomous driving system may include a fire sensor and fire suppression system, as well as a crash detection and recording system.

C: Communications and Data Transfer

The HERO autonomous driving system may include communication systems, in addition to those installed in the base vehicle, for remote driving and system diagnostics. HERO may be configured to receive, process and act on the same kinds of verbal instructions given to a human driver from the pit lane control centre. It may also be configured to generate and transmit the same kinds of verbal instructions given by a human driver to the pit lane control centre and to generate and transmit raw or processed sensor data required for remote driving. All remote driving, or teleoperation tasks can be completed by a human or software system.

Raw or processed sensor data required for remote driving may provide sufficient inputs to a six-degree of freedom driver in a loop simulator that fully immerses a remote human driver in the environment and dynamics of the vehicle.

The HERO autonomous driving system may be configured to access the pre-existing vehicle CAN bus, or other communication network, to access data sources not available to the human driver or at higher frequencies than to a human driver.

Remote driving, or teleoperation tasks may be executed by a human or software system at several different levels of vehicle control abstraction including; operational, tactical and strategic control. Onboard storage devices may be removed to allow physical transfer of the recorded data to external devices.

D: Mechanical Engineering

The HERO autonomous driving system may include physical actuators that engage with and control mechanical controls in the car or vehicle, such as the brakes and steering, where these systems have not been or, cannot be easily, adapted to drive-by-wire control. It may also include a battery and a computer system powered by the battery; the computer system then processes the inputs from the sensors in the autonomous driving system and outputs controls to the physical actuators, making the autonomous driving system entirely self-contained.

The HERO autonomous driving system may be configured to access the same pre-existing CAN bus, or other communication network, as the systems used by a human driver (e.g. gear selection, power recovery/rejuvenation; clutch control; brake balance between front and rear brakes; engine mapping; communications functions; all drive by wire functions, including steering throttle, brake, independent motor torques, active suspension). The actuators that engage with and control mechanical controls may include one or more of the following actuators; electric, hydraulic, pneumatic, mechanical, magnetic actuators. Forced air fans that control airflow required for cooling may be included. Water based cooling systems, designed to extract heat from components and discharge that heat through heat exchangers/radiators, may be included.

E: Software

The software used in the HERO autonomous driving system to drive the vehicle may be supplemented by different software that performs the same driving task in serial or parallel autonomy. The software used to drive the vehicle may be installed remotely by over the air updates, through a fixed network, and/or may be installed by the local connection of a laptop or portable storage device. A unique key, physical or digital, may be used to permit the autonomous driving system to activate and remain operational.

The driving behaviour of AI software in the system may be evaluated by an independent software agent performing the role of a motor racing steward. An independent software agent may also perform the role of a motor racing steward and operates on a computer inside the vehicle or remotely. Software used for the driving task may be designed to replicate the driving style of a specific human or fictional character, which may correspond to the design cues and decoration used on the HERO system and the rest of the vehicle.

F: Physical Form

The existing human-driven vehicle may be an open cockpit vehicle and an outer casing or surface of the autonomous driving system when fitted to the vehicle may then form part of the aerodynamic external surface of the vehicle. The aerodynamic performance of the car or vehicle equipped with the autonomous driving system may then be tuned to match as closely as possible the aerodynamic performance of the human driven version. The outer casing or surface of the autonomous driving system may have a shape that replicates the shape of an AeroScreen, windshield, HALO or any other driver crash protection system.

The HERO autonomous driving system may be reconfigured to match the occupant space available depending upon the original vehicle design.

The origin vehicle which is re-purposed to be an autonomous vehicle may be a single seat racing car, such as: a Formula 1, Formula 2, Formula 3, Formula 4, Formula Renault, Formula Ford, Formula E, Formula Nippon, IndyCar, Indy Lights type of racing car. The original vehicle may also an airplane, powerboat, go-kart or any vehicle with an open cockpit, closed cockpit or any other vehicle.

In any event, the overall weight of the HERO autonomous driving system may be the equivalent of a human driver. The weight distribution of the system may be designed to be the equivalent of a human driver. Critical components may be duplicated in order to improve fault tolerance and performance under faults or degradations.

The HERO autonomous driving system may have a physical form of a humanoid robot. It may also be reconfigurable to adapt to the occupant space available within the original vehicle.

Further, the battery system may be designed to be compliant with fight safety regulations and related impact protection standards. The battery may be divided into two separate units thereby providing two independent sources of power to facilitate back-up or uninterrupted power to components in the event failures.

G: Spectator Experience

The HERO autonomous driving system may include visual indictors, such as lights, panels, or paints, that change in relation to the autonomous system state, and/or the vehicle state and/or the environment state. As noted above, the driving behaviour of AI software in the system may be evaluated by an independent software agent performing the role of a motor racing steward. An independent software agent may also perform the role of a motor racing steward and operates on a computer inside the vehicle or remotely.

Figure 5:
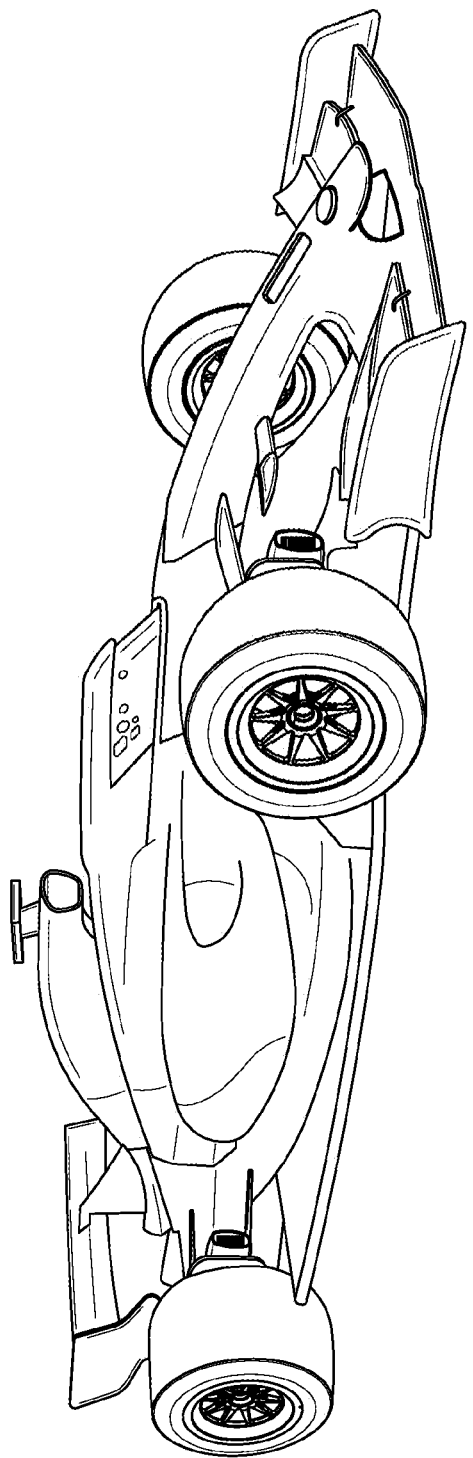
FIG. 5 is a render of a Formula 1 race car implementing the HERO autonomous driving system; the car adopts the design cues and style of the racing driver Ayrton Senna.

The outer surface of the HERO autonomous driving system may be painted or wrapped in a unique colour scheme to distinguish between different systems. The unique colour scheme that distinguishes different systems can replicate the helmet designs of historic, current or future racing drivers be those real or virtual, as shown in FIG. 5, which is a render of a Formula 1 race car implementing the HERO autonomous driving system; the car adopts the design cues and style of the racing driver Ayrton Senna.

Figure 6:
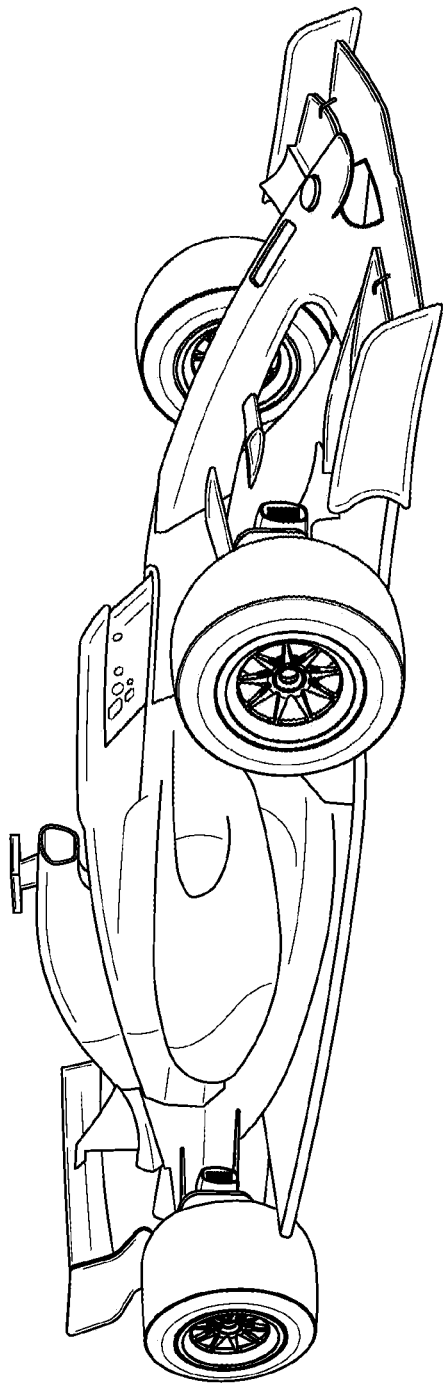
FIG. 6 is a render of a Formula 1 race car implementing the HERO autonomous driving system; the car adopts the design cues and style of the racing driver Nigel Mansell.
Figure 7:
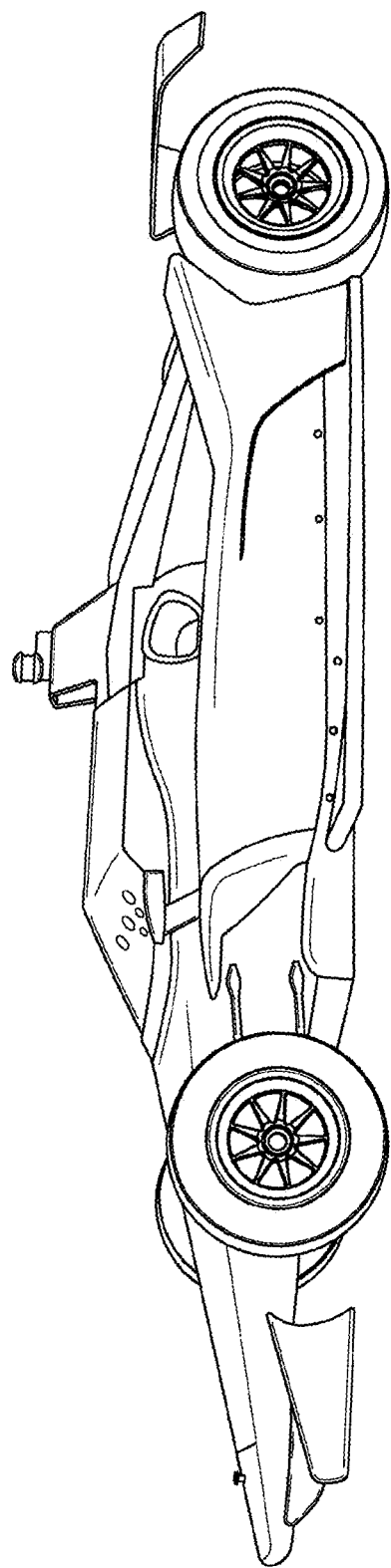
FIG. 7 is a render of an IndyCar race car implementing the HERO autonomous driving system (in this case replacing the AeroScreen and not the HALO); the car adopts the design cues and style of the racing driver Johnny Rutherford.
Figure 8:
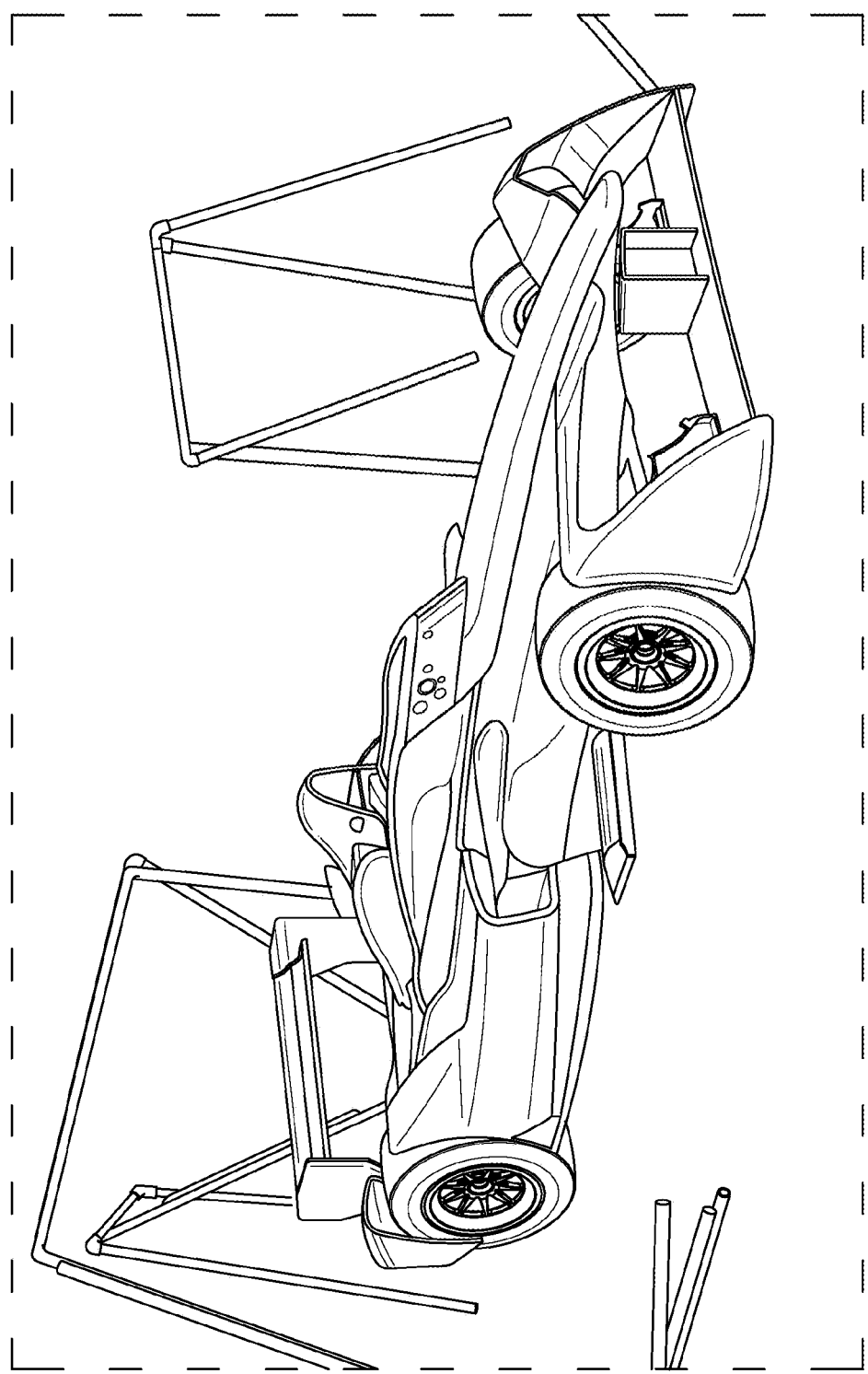
FIG. 8 is a render of a Formula E Gen1 where the original design did not include a HALO crash protection system.

FIG. 6 is a render of a Formula 1 race car implementing the HERO autonomous driving system; the car adopts the design cues and style of the racing driver Nigel Mansell. FIG. 7 is a render of an IndyCar race car implementing the HERO autonomous driving system (in this case replacing the AeroScreen and not the HALO); the car adopts the design cues and style of the racing driver Johnny Rutherford. FIG. 8 is a render of a Formula E Gen1 where the original design did not include a HALO; in this case, retro-fitting the HERO autonomous driving system requires mounting using the secondary roll structure, headrest and deformable crash-protection structures.

Software used for the driving task may, as also noted above, be designed to replicate the driving style of a specific human or fictional character, which may correspond to the design cues and decoration used on the HERO system and the rest of the vehicle.

The safety and integrity of the original vehicle is generally sufficiently maintained after mounting the autonomous driving system to the original vehicle to enable safe competition between human driven cars and one or more of these original vehicles that are fitted with an autonomous driving system.

The HERO autonomous driving system may include audible sound generators that change in relation to the autonomous system state, and/or the vehicle state and/or the environment state; the system may also generate verbal communication, equivalent to the verbal instructions given by a human driver to the pit lane control centre, with the audible voice signature of a human or fictional character.

The HERO autonomous driving system may be part of a complete vehicle racing system including one or more human-driven vehicles of a specific type and one or more vehicles of the same type and that are equipped with an autonomous driving system, in which each autonomous driving system is (a) installed in an original vehicle of that specific type and (b) replaces one or more pre-existing components that would otherwise be present in the original vehicle, and (c) occupies at least some the space that would otherwise be occupied by a human, such as a driver or pilot, and (d) configured to provide autonomous driving capabilities to that vehicle, the autonomous driving system including one or more sensors and compute resources, operating to provide an autonomous or remote driving system. The autonomous driving system may be the HERO system described above.

The vehicle racing system may including (a) one or more human-driven vehicles of a specific type; (b) one or more vehicles of the same type and that are equipped with a HERO autonomous driving system; (c) one or more human-driven vehicles of an alternative type; and (d) one or more vehicles of the same alternative type and that are equipped with a HERO autonomous driving system.

H. Internal Zone Organisation

Figure 9:
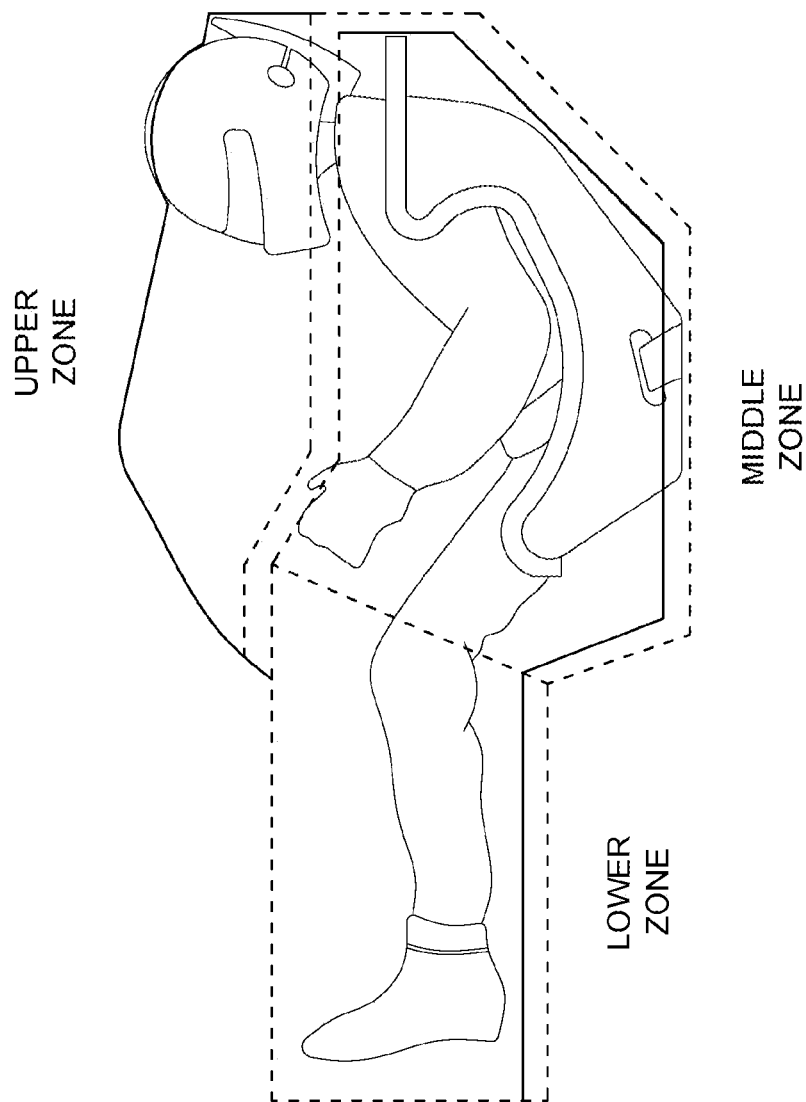
FIG. 9 is a schematic showing how the main three Zones of the HERO autonomous driving system occupy the region that would otherwise be occupied by a human driver.

The HERO autonomous driving system may be organised or split into three sections or installation zones: Upper, corresponding to the area occupied by the driver's head, Middle (corresponding to the area occupied by the driver's torso) & Lower (corresponding to the area occupied by the driver's legs). FIG. 9 shows this high level organisation, showing how the human driver would relate to these zones.

Figure 10:
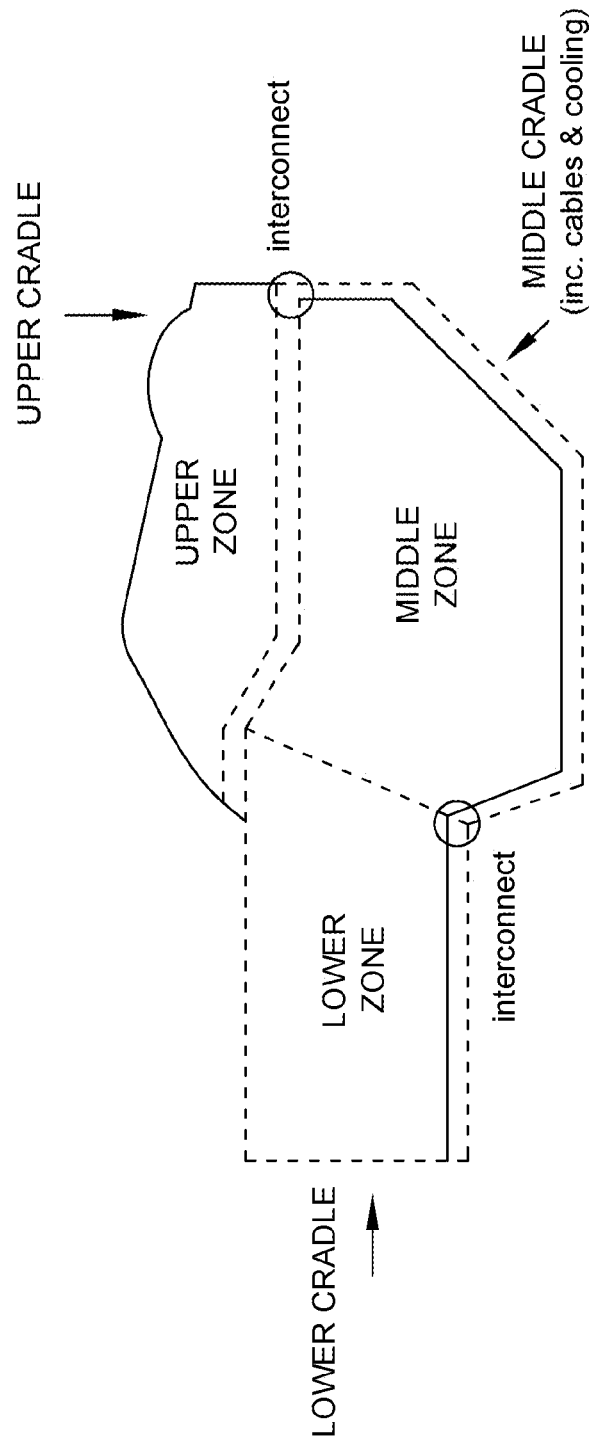
FIG. 10 is a schematic showing the main zones and cradles of the HERO autonomous driving system.
Figure 11:
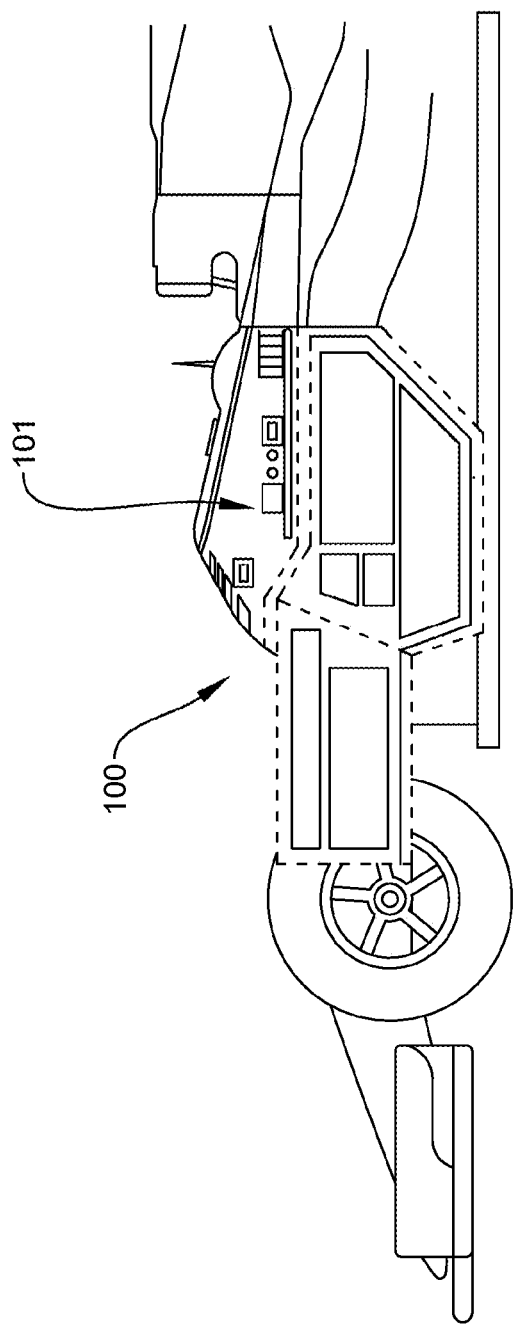
FIG. 11 is a schematic of the HERO autonomous driving system superimposed onto the single seat race car shown in FIGS. 1 and 3.
Figure 12:
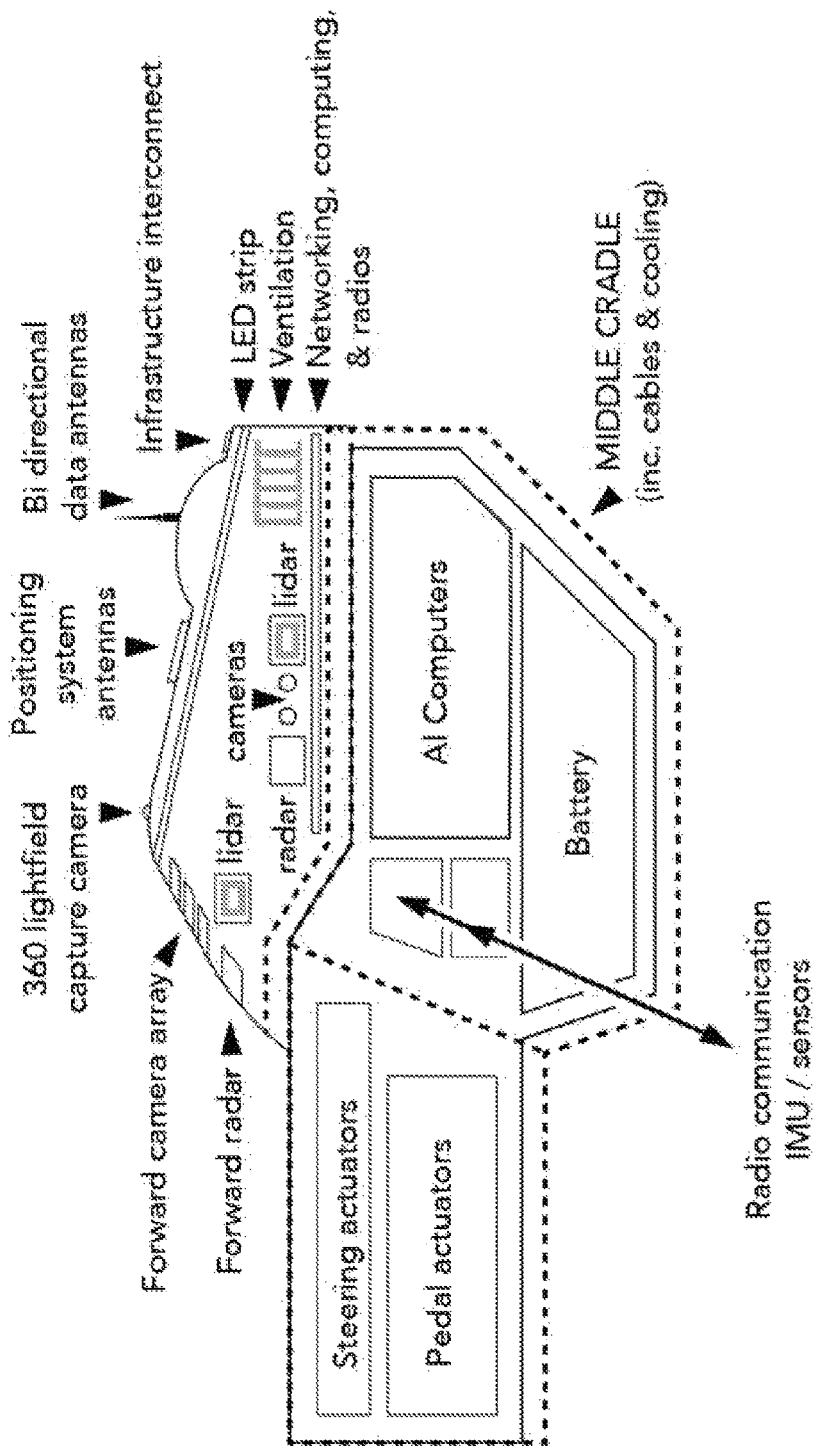
FIG. 12 is a schematic of the HERO autonomous driving system showing the key sub-systems and elements.

The Upper, Middle and Lower Zones may each include networking, computing, communications devices and sensors that do not require a view of the external environment. Each of the three zones may be separate sub-systems with interconnections that enable installation in the order of Lower, Middle, Upper. The Upper, Middle and Lower Zones may include cradles that can be interconnected and used to house cable harnesses for power and electrical signals, as well as pipework and ducting for cooling. FIG. 10 shows these cradle and interconnects. FIG. 11 shows how the entire HERO autonomous driving system 100 fits in the racing car. FIG. 12 shows the positioning of the key components and sub-systems in the HERO autonomous driving system.

We will look now at how the different sub-systems and features are organised in this sort of three Zone system.

Zone Organisation: Sensors

The Upper Zone may include a sensory canopy 101 (FIG. 11) that includes sensory and communications devices, including one or more of: V2X, WIFI, Cellular, and software defined radios, that require a clear and unobstructed view of the external environment. The sensory canopy 101 may also include one or more of: radio communication and satellite navigation antennas and illuminations, such as LED lights, panels and displays.

Rear facing sensors may be attached to the Upper Zone and may extend from the Upper Zone sensory canopy and be attached to mounting points used for wing mirrors.

Zone Organisation: Physical Mounting

The Upper Zone may also be mounted to the mounting points of one or more of: the cockpit, deformable crash-protection structures, driver head protection system (HALO), driver windshield and/or secondary roll structure.

The Upper Zone may be designed in a manner whereby a mounting frame is attached to pre-existing mounting points upon the vehicle and the Upper Zone sensory canopy is then attached to the mounting frame using quick release fittings. The Middle and Lower Zones may be designed in a manner whereby mounting frames are attached to pre-existing mounting points on the vehicle, and each Zone may then be attached to these mounting frames using quick release fittings. Interconnections between Lower, Middle and Upper Zones may take the form of push fit connectors for mechanical, electrical or fluid interfaces.

The HERO autonomous driving system may, when removed from the vehicle, be configured to be mounted to a supporting frame so that Upper, Middle and Lower Zones can be interconnected and powered on to ensure full system testing.

Zone Organisation: Mechanical Engineering

The Middle Zone and/or Lower Zone may include actuators required for the steering wheel and/or brake and/or throttle pedal(s) and may be mounted to any one or more of the following: the pre-existing seat mounting points; the pre-existing seatbelt mounting points, in each case within the driver cockpit. These Zones may further include actuators required for interfacing to the brake master cylinder.

The Upper Zone may include access panels and hatches that enable Middle or Lower Zones to be accessed without removal of the sensory canopy.

The Upper, Middle and Lower Zones may include cradles that can be interconnected and used to house cable harnesses for power and electrical signals, as well as pipework and ducting for cooling.

The Upper Zone sensory canopy may include handles or attachment points for external fitted lifting equipment. The Middle & Lower zones may also include handles or attachment points for external fitted lifting equipment.

Zone Organisation: Physical Form

The Middle Zone and/or Lower Zone may be moulded to the internal contours of the driver cockpit for the purpose of maximising available volume for system components and securing these subsystems from movement during driving.

The Upper Zone may be a single integrated whole which can be installed/replaced in its entirety. Alternatively, the Upper Zone may allow individual sensors/sub-components to be installed/replaced without the need to replace the entire Upper Zone sensory canopy.

The Upper Zone may closely follow the contours of the external bodywork to minimise aerodynamic disturbance, ensure a water tight seal and maintain intended aesthetics.

The Upper, Middle and Lower Zones may be designed as a single unit that can be installed or removed from the vehicle as a whole.

The three zones may be designed as separate sub-systems with interconnections that enable installation in the order of Lower, Middle, Upper.

The Middle Zone may be made up of Middle P (corresponding to the area occupied by the driver's pelvis) and Middle C (corresponding to the area occupied by the driver's chest) Zones. Each of the zones are separate sub-systems with interconnections that enable installation in the order of Middle P Lower, Middle C, Upper.

Zone Organisation: Electrical Components

The Middle Zone and/or Lower Zone may include one or more batteries required for powering the autonomous driving system.

The Upper Zone sensory canopy may include touch sensitive surfaces. Switches or buttons on the external surface of Upper Zone sensory canopy may isolate a power supply to individual components or the system as a whole when a shutdown or restart is required.

Zone Organisation: Environmental

The Lower Zone may include ducting that directs air flow originating from the nose of the race car towards the autonomous driving system components that require cooling in all three zones. The Upper Zone may include ducting that directs air flow originating from the Upper Zone sensory canopy towards the autonomous driving system components that require cooling in all three zones. The Upper Zone may also include heat exchangers/radiators that require direct access to external airflow.

The Upper Zone may include devices necessary for cooling, heating, cleaning and protecting sensory devices from environmental conditions.

The Upper Zone may include vents in the sensory canopy that allow air to escape from Upper, Middle or Lower Zones. The Upper Zone may also include mechanical, electrical or fluid interfaces to enable the connection of external systems. These Upper Zone fluid interfaces may be connected to an external fire suppression system.

Zone Organisation: Communications and Data Transfer

The Upper Zone may include external connectors for the physical connection of the autonomous driving system to external equipment or infrastructure while the vehicle is static, e.g. for the purposed of external power supply, changing, network communications and cooling.

Zone Organisation: Spectator Experience

Illuminations, such as LED lights, panels and displays may be positioned on the top surface of the Upper Zone sensory canopy and may also be located in a manner designed to be viewed from roll hoops onboard cameras. Illuminations, such as LED lights, panels, displays or lasers, fitted to the Upper Zone sensory canopy may be designed to illuminate the environment while driving where ambient light levels are low, such as at night, in tunnels, garages or car parks.

IR LEDs may be fitted to the Upper Zone sensory canopy and configured to be flashed in high-frequency patterns designed to be detected by event-based cameras and used for identification, location or other communication purposes.

The original vehicle re-purposed to be autonomous may be a single seat racing car that has been modified with an additional seat used for carrying a passenger e.g. as a ride-along for promotional or experiential purposes. The HERO autonomous driving system may, when installed in a two-seat version of a single seat racing car, occupy the forward most occupant seat. It may, when installed in a two-seat version of a single seat racing car, retain enough occupant space for a human passenger. It may, when installed in a two-seat version of a single seat racing car, allow a human passenger to control the vehicle through drive-by-wire interfaces at the operational, tactical or strategic level. It may, when installed in a two-seat version of a single seat racing car, includes displays, for example when mounted to the Upper Zone, be located in the eye line of the human passenger to form part of the human machine interface. It may, when installed in a two-seat version of a single seat racing car, includes a connection to AR/VR head mounted display for the human passenger to form part of the human machine interface.

The HERO autonomous driving system may include, as for example part of the Upper Zone sensory canopy, haptic interfaces for kinaesthetic communication, including the use of mid-air ultrasound haptics.

It may also, when installed in a two-seat version of a single seat racing car, include haptic feedback interfaces integrated into the seat, seat belts or passenger fire protected clothing.

I: Augmented and Virtual Worlds

The HERO autonomous driving system described above is implemented in a physical, real-world vehicle, that operates in the real-world. There are however additional possibilities or 'driving modes'. We will look first at the modes in which there is a real-world vehicle operating in the real-world and so the primary spectator or viewer experience includes that of watching a real-world vehicle.

First, virtual objects can be added to the physical real-world, requiring the HERO autonomous driving system to be given the parameters (location, extent etc) of the virtual objects to add to its internal model of the world it is travelling through. For example, there could be a virtual barrier that is suddenly imposed across the real-world race track, apparent to the real-world vehicle and its HERO autonomous driving system, and to any viewers watching the race on TV or streaming; the HERO autonomous driving system would then need to break the car sufficiently quickly to avoid crashing into the virtual barrier. Or a virtual chicane could be suddenly added, requiring the HERO autonomous driving system to be given the parameters (location, extent etc) of the virtual chicane to add to its internal model of the world it is travelling through, and to hence rapidly steer and control the real-world vehicle through the chicane; as before, the chicane would be apparent to anyone watching the race on TV or streaming, or locally at the race using augmented reality glasses, using conventional real-time video insertion technology. As well as virtual objects, virtual vehicles could also be added to the real-world race track, and the HERO autonomous driving system would then be given the location and other parameters for these virtual vehicles and would then need to autonomously avoid, race and overtake these virtual vehicles.

Secondly, the real-world vehicle could be controlled by or otherwise mimic the operation of a virtual vehicle, existing in a virtual world. So, for example, a gamer could be playing a racing game on a computer console; he or she could then be controlling not just the virtual vehicle, existing in the computer game, but also the real-world vehicle, racing in the real-world. There could be several real-world vehicles, each controlled by a gamer playing a compute game, and hence racing each other in the real-world. Or some of the real-world vehicles could implement the HERO autonomous driving system; so we would have a race between real-world vehicles being controlled by gamers, competing against real-world vehicles using the HERO autonomous driving system.

The physical vehicle, operating a real-world HERO autonomous driving system, can also be replicated in a virtual world as a virtual vehicle. Now, the spectator experience includes that of watching a virtual vehicle operating in a virtual world (there may still be spectators or viewers watching real-world vehicles operating in the real-world too).

The virtual world can be based on a digital twin of the real world. Real-world location and other dynamic data can be sent from the physical vehicle and physical world into the virtual world. This enables the accurate representation of physical objects (such as the physical vehicle) within the virtual world and enables virtual objects to be aware of physical objects. These virtual vehicles, mirroring the position and behaviour of their digital twin real-world vehicles, can race one another. They can also race virtual vehicles which are purely virtual and do not replicate or mirror a real-world vehicle. The purely virtual vehicles will implement a purely virtual version of the HERO autonomous driving system.

This virtual world, including digital twins of real-world vehicles, and/or purely digital vehicles, may be a digitally reproduced representation of the physical world in which the digital representation may be based directly on transmitted data from physical vehicles e.g. camera feeds. So the real-world vehicles can include real-world cameras filming the real-world scene, and the virtual world can then be created or synthesised (in whole or part) using the data from these cameras. This virtual world can include augmented reality objects—for example digital signage or advertising or vehicles.

The virtual world can also be based upon a digital representation generated artificially using computer graphics rendering which combines both real-time data and pre-acquired data to construct an accurate evolving digital twin of the physical world. For example, the virtual world can include a computer rendered race car track and stands, but real-time data showing real-world clouds, sky, crowds or other scene elements and dynamic, changing scene elements can be obtained from real-world cameras and then superimposed onto the virtual world, made up of the computer rendered race car track.

The virtual world can also include vehicles not fitted with autonomous driving systems, such as trucks, buses, vans, cars, motorbikes, bicycles. It can also include other dynamic virtual objects, such as simulated pedestrians, animals, robots or other gaming objects.

The HERO autonomous driving system may be part of a digital game or virtual world system programmed with a digital twin or replica vehicle of a real-world vehicle in which the twin or replica vehicle is (a) equipped with a virtual autonomous driving system that operates within a virtual world generated by the game or virtual world system and (b) connected, in real-time, to the equivalent physical vehicle in the real-world, and in which the game replicates the location, and/or status and/or movement of the real-world vehicle in their digital twin or replica vehicle in the virtual world.

Further, the HERO autonomous driving system may be part of a digital game or virtual world system programmed with a digital twin or replica vehicle of a real-world vehicle in which the twin or replica vehicle is connected, in real-time, to the equivalent physical vehicle in the real-world, the physical vehicle including a HERO autonomous driving system, and in which the game replicates the location, and/or status and/or movement of the real-world vehicle in the digital twin or replica vehicle in the virtual world.

The digital game or virtual world system may then provide an end-user player of the game or virtual world system with their own vehicle which they manually control and which the system enables the player to race or compete against the digital twin or replica vehicle.

The HERO autonomous driving system may be part of a digital game or virtual world system programmed with a digital twin or replica vehicle of a real-world vehicle in which the twin or replica vehicle is (a) equipped with an autonomous driving system that exists within a virtual world generated by the game or virtual world system and (b) communicates its location, and/or status and/or movement to vehicles and/or human-drivers and/or autonomous driving systems that each exist in the real-world. The digital twin or replica vehicle provides location, and/or status and/or movement control signals to control the vehicles and/or human-drivers and/or autonomous driving systems that each exist in the real-world.

Whilst the above describes a real-world vehicle using the HERO autonomous driving system, it is possible to implement these features in a vehicle using an autonomous system that does not utilise the specific limitations defined in claim 1 but is instead fitted to specially designed autonomous vehicle.

The invention claimed is:

1. An autonomous driving system for a vehicle, the vehicle being originally configured or designed to be human-driven, in which the autonomous driving system is configured (a) to replace one or more components that would otherwise be present in an original vehicle, and (b) to occupy a driver cockpit volume space that would otherwise be occupied by a human, such as a driver or pilot, such that human re-entry is precluded without removal of the system, and (c) to provide autonomous driving capabilities to the vehicle, the autonomous driving system including one or more sensors and compute resources, operating to provide an autonomous or remote driving system; and
   in which the vehicle is an open cockpit vehicle and an outer casing or external surface of the autonomous driving system, when fitted to the vehicle is shaped to conform to and replace or supplement an aerodynamic structure of the vehicle, thereby forming, forms part of an aerodynamic external surface of the vehicle.

2. The autonomous driving system of claim 1 in which the autonomous driving system uses pre-existing anchor or fixing points in the vehicle for one or more of the components that are replaced by the autonomous driving system, and are not general structural mounting points.

3. The autonomous driving system of claim 2 in which the component that is replaced is one or more of the following: driver crash protection system, windshield, seat, seatbelts, steering wheel.

4. The autonomous driving system of claim 2 in which the replaced component is a seat and the pre-existing anchor points include one or more seat anchor points designed specifically to secure the replaced seat.

5. The autonomous driving system of claim 2 in which the replaced component is a seatbelt and the pre-existing anchor points include one or more seatbelt anchor points designed specifically to secure the replaced seatbelt.

6. The autonomous driving system of claim 2 in which the replaced component is a headrest and the pre-existing anchor points include one or more headrest anchor points designed specifically to secure the replaced headrest.

7. The autonomous driving system of claim 2 in which the replaced component is a windshield and the pre-existing anchor points include one or more windshield anchor points designed specifically to secure the replaced windshield.

8. The autonomous driving system of claim 2 in which the replaced component is a crash protection system and the pre-existing anchor points include one or more crash protection system anchor points designed specifically to secure the replaced crash protection system.

9. The autonomous driving system of claim 2 in which the replaced component is a HALO crash protection system and the pre-existing anchor points include one or more HALO crash protection system anchor points designed specifically to secure the replaced HALO crash protection system.

10. The autonomous driving system of claim 2 in which the replaced component is a AeroScreen and the pre-existing anchor points include one or more AeroScreen anchor points designed specifically to secure the replaced AeroScreen.

11. The autonomous driving system of claim 2 in which the replaced component is a deformable crash-protection structure and the pre-existing anchor points include one or more deformable crash-protection structure anchor points designed specifically to secure the replaced deformable crash protection structure.

12. The autonomous driving system of claim 1 which is configured to attach to a secondary roll structure in front of a driver cockpit.

13. The autonomous driving system of claim 1 which, when organised as a single unit, is designed to be mechanically expandable or collapsible to facilitate installation or removal from the vehicle.

14. The autonomous driving system of claim 1 which when organised as a single unit, is designed to be mechanically expandable so that mechanical contact with one or more internal surfaces of the cockpit and occupant space is sufficient for secure installation within the vehicle.

15. The autonomous driving system of claim 1 which is organised or split into three sections or installation zones: Upper, corresponding to an area occupied by a driver's head, Middle corresponding to an area occupied by a driver's torso & Lower corresponding to an area occupied by a driver's legs.

16. The autonomous driving system of claim 15 in which the Upper Zone is mounted to mounting points of one or more of: an cockpit, deformable crash protection structures, driver head protection system (HALO), driver windshield or secondary roll structure.

17. The autonomous driving system of claim 15 in which the Middle Zone and/or Lower Zone are mounted to an pre-existing seat, and seatbelt, mounting points within driver cockpit.

18. The autonomous driving system of claim 15 in which the Middle Zone and/or Lower Zone include batteries required for powering the autonomous driving system.

19. The autonomous driving system of claim 15 in which the Middle Zone and/or Lower Zone include actuators required for interfacing to one or more of: a steering wheel, steering column, brake pedal, brake master cylinder, throttle pedal, clutch, gear shift or other mechanical interfaces.

20. The autonomous driving system of claim 15 in which the Upper Zone includes devices necessary for cooling, heating, cleaning and protecting sensory devices from environmental conditions.

21. The autonomous driving system of claim 15 in which in rear facing sensors attached to the Upper Zone extend from an Upper Zone sensory canopy and are attached to mounting points used for wing mirrors.

22. The autonomous driving system of claim 15 in which the Upper Zone includes external connectors for a physical connection of the autonomous driving system to external equipment or infrastructure while the vehicle is static, e.g. for the purpose of external power supply, changing, network communications and cooling.

23. The autonomous driving system of claim 15 in which the Upper, Middle and Lower Zones include cradles that can be interconnected and used to house cable harnesses for power and electrical signals, as well as pipework and ducting for cooling.

24. The autonomous driving system of claim 1 in which an Upper, Middle and Lower Zones all include networking, computing, communications devices and sensors that do not require a view of an external environment.

25. The autonomous driving system of claim 1 in which an Upper Zone includes a sensory canopy that forms a distinct structural structure that houses sensory and communications devices, including one or more of: V2X, WIFI, Cellular, and software defined radios, that require a clear and unobstructed view of an external environment.

26. The autonomous driving system of claim 1 which includes substantially all sensors needed to enable autonomous performance.

27. The autonomous driving system of claim 26 which includes one or more of the following sensors: radar, LIDAR, cameras, machine vision cameras, IR cameras, hyperspectral cameras, event based cameras that trigger at a pixel level when light levels on a pixel alter, Global Navigation Satellite System (GNSS); inertial measurement systems; vibration and acoustic sensors, aerodynamic sensors, Ultrawide Band Positioning System, air pressure sensors, magnetometers, temperature sensors, rain sensors, lap count sensors, RFID sensors, ground penetrating radar.

28. The autonomous driving system of claim 26 which includes forward, sideways and rearward facing sensors to provide 360 degree environment information.

29. The autonomous driving system of claim 26 which includes vertically orientated sensors to capture physical objects in an environment and also a light field above the vehicle.

30. The autonomous driving system of claim 26 in which supplementary computers, processors or computational resources are allocated to a processing of sensor data for purposes of media and entertainment content production.

31. The autonomous driving system of claim 26 in which data from sensors and equipment is recorded using storage devices onboard the vehicle.

32. The autonomous driving system of claim 1 which includes communication systems, in addition to those installed in the vehicle, for remote driving, system diagnostics or over the air updates.

33. The autonomous driving system of claim 1 which is configured to receive, process and act on verbal instructions given to a human driver from a pit lane control centre, or other relevant communication centres or portals.

34. The autonomous driving system of claim 1 which is configured to generate and transmit verbal instructions given by a human driver to an pit lane control centre, or other relevant communication centres or portals.

35. The autonomous driving system of claim 1 which is configured to generate and transmit raw or processed sensor data required for remote driving.

36. The autonomous driving system of claim 1 in which remote driving, or teleoperation tasks can be executed by a human or software system at several different levels of vehicle control abstraction including; operational, tactical and strategic control.

37. The autonomous driving system of claim 1 in which software used to drive the vehicle is supplemented by different software that performs a same driving task in serial or parallel autonomy.

38. The autonomous driving system of claim 1 in which the aerodynamic performance of the vehicle equipped with the autonomous driving system is tuned to match an aerodynamic performance of an original human driven version of the vehicle.

39. The autonomous driving system of claim 1 in which the outer casing or external surface of the autonomous driving system has a shape that replicates a shape of an aeroscreen, windshield, HALO or any other driver crash protection system.

40. The autonomous driving system of claim 1 in which the autonomous driving system is able to be reconfigured to match an occupant space available depending upon an original vehicle design.

41. The autonomous driving system of claim 1 in which the vehicle is a single seat racing car.

42. The autonomous driving system of claim 1 in which the original vehicle is one of the following: a Formula 1, Formula 2, Formula 3, Formula 4, Formula Renault, Formula Ford, Formula E, Formula Nippon, IndyCar, Indy Lights type of racing car.

43. The autonomous driving system of claim 1 in which the vehicle is an airplane, powerboat, go-kart or any vehicle with an open cockpit, closed cockpit or any other vehicle.

44. The autonomous driving system of claim 1 with an overall weight equivalent to a human driver.

45. The autonomous driving system of claim 1 in which weight distribution of the autonomous driving system is designed to be equivalent of a human driver.

46. The autonomous driving system of claim 1 in which critical components are duplicated in order to improve fault tolerance and performance under faults or degradations.

47. The autonomous driving system of claim 1 with a physical form of a humanoid robot.

48. The autonomous driving system of claim 1 which includes visual indictors, such as lights, panels, or paints, that change in relation to the autonomous system state, and/or a vehicle state and/or an environment state.

49. The autonomous driving system of claim 1 in which an independent software agent performs a role of a motor racing steward and operates on a computer inside the vehicle or remotely.

50. The autonomous driving system of claim 1 with a unique colour scheme that distinguishes different systems and replicates helmet designs of historic, current or future racing drivers be those real or virtual.

51. The autonomous driving system of claim 1 in which safety integrity of the original vehicle is sufficiently maintained after mounting the autonomous driving system to the original vehicle to enable safe competition between human driven cars and one or more original vehicles that are fitted with an autonomous driving system.

52. The autonomous driving system of claim 1 which includes audible sound generators that change in relation to an autonomous system state, and/or a vehicle state and/or an environment state.

53. The autonomous driving system of claim 1 in which software used for a driving task is designed to replicate a driving style of a specific human or fictional character.

54. The autonomous driving system of claim 1 in which the vehicle is a single seat racing car that has been modified with an additional seat used for carrying a passenger e.g. as a ride-along for promotional or experiential purposes.

55. The autonomous driving system of claim 1 which, when installed in a two-seat version of a single seat racing car, allows a human passenger to control the vehicle through drive-by-wire interfaces at operational, tactical or strategic level.

56. The autonomous driving system of claim 1 in which the autonomous driving system is controlled by or mimics a virtual vehicle, existing in a virtual world.

57. The autonomous driving system of claim 1 in which the autonomous driving system is replicated in a virtual world as a virtual vehicle.

58. The autonomous driving system of claim 1 which, when organised as a single unit, is designed to be flexible or articulated to facilitate installation or removal from the vehicle.

59. The autonomous driving system of claim 1, wherein the autonomous driving system is a self-contained system configured to occupy at least a portion of the originally intended driver cockpit volume space.

60. A method of testing and developing autonomous driving systems, comprising the step of using an autonomous driving system as part of a technology testing and development program, in which the autonomous driving system is for a vehicle, the vehicle being originally configured or designed to be human-driven, in which the autonomous driving system is configured (a) to replace one or more components that would otherwise be present in an original vehicle, and (b) to occupy a driver cockpit volume space that would otherwise be occupied by a human, such as a driver or pilot, such that human re-entry is precluded without removal of the system, and (c) to provide autonomous driving capabilities to that vehicle, the autonomous driving system including one or more sensors and compute resources, operating to provide an autonomous or remote driving system; and in which the vehicle is an open cockpit vehicle and an outer casing or surface of the autonomous driving system when fitted to the vehicle is shaped to conform to and replace or supplement an aerodynamic structure of the vehicle, thereby forming part of an aerodynamic external surface of the vehicle.

61. A vehicle designed using the results of a testing and developing method comprising the step of using an autonomous driving system as part of a technology testing and development program, in which the autonomous driving system is for a vehicle, the vehicle being originally configured or designed to be human-driven, in which the autonomous driving system is configured (a) to replace one or more components that would otherwise be present in an original vehicle, and (b) to occupy a driver cockpit volume space that would otherwise be occupied by a human, such as a driver or pilot, such that human re-entry is precluded without removal of the autonomous driving system, and (c) to provide autonomous driving capabilities to that vehicle, the autonomous driving system including one or more sensors and compute resources, operating to provide an autonomous or remote driving system; and in which the vehicle is an open cockpit vehicle and an outer casing or surface of the autonomous driving system when fitted to the vehicle is shaped to conform and replace an aerodynamic structure of the vehicle, thereby forming part of an aerodynamic external surface of the vehicle.

\* \* \* \* \*